Nov. 3, 1925.
J. EVICH
DIRECTION INDICATOR
Filed June 17, 1924    2 Sheets-Sheet 1
1,559,603
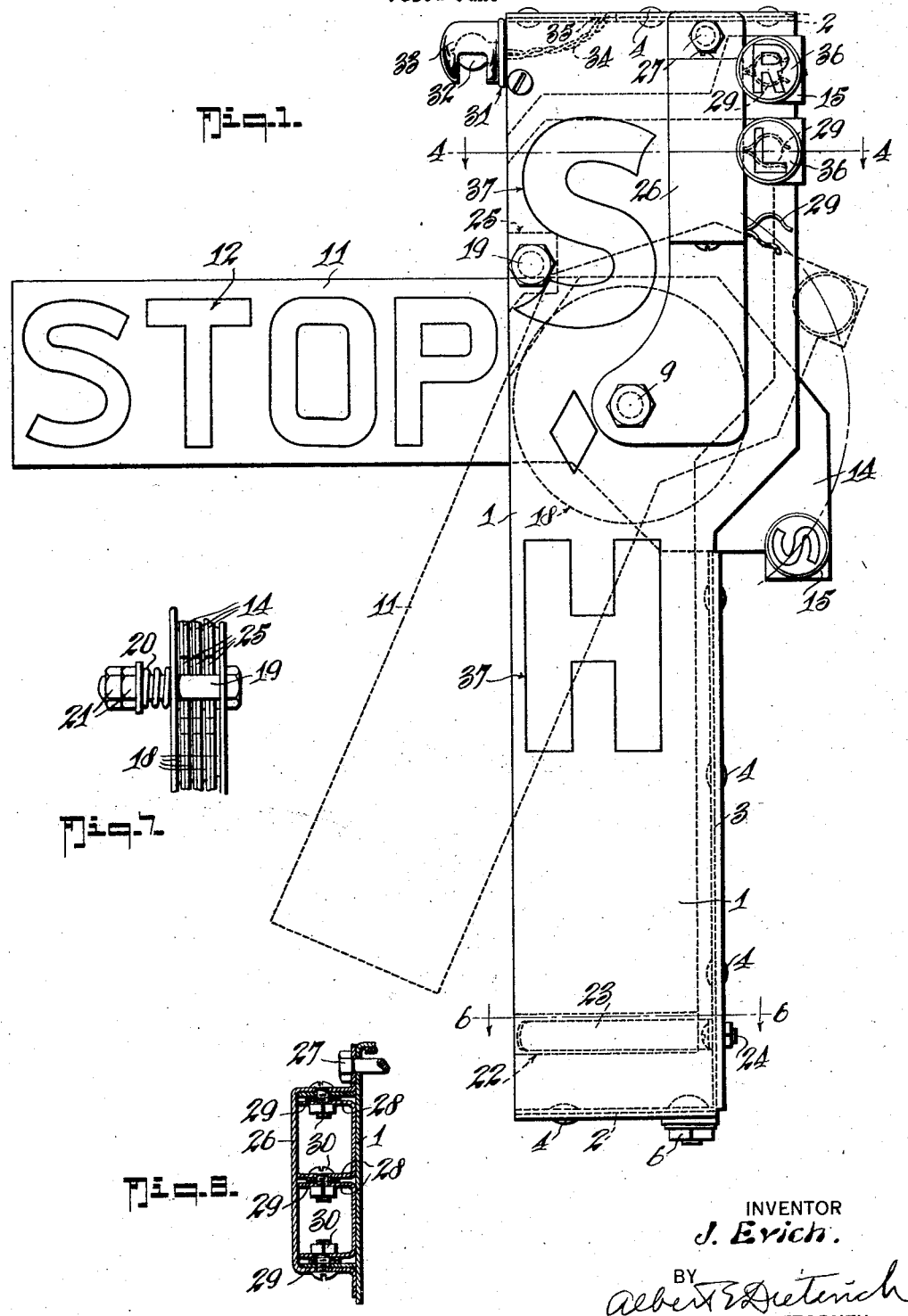
INVENTOR
J. Evich.
BY
Albert E. Dietrich
ATTORNEY Nov. 3, 1925.                    1,559,603
J. EVICH
DIRECTION INDICATOR
Filed June 17, 1924          2 Sheets-Sheet 2
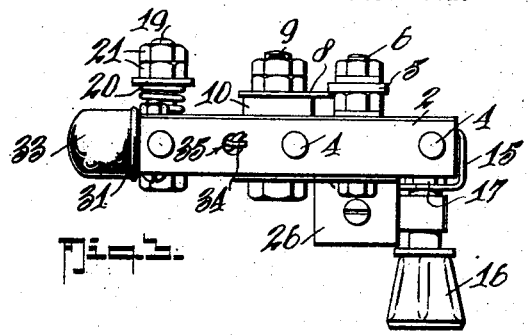
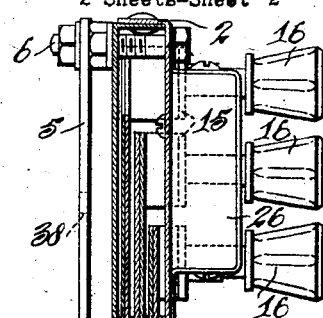
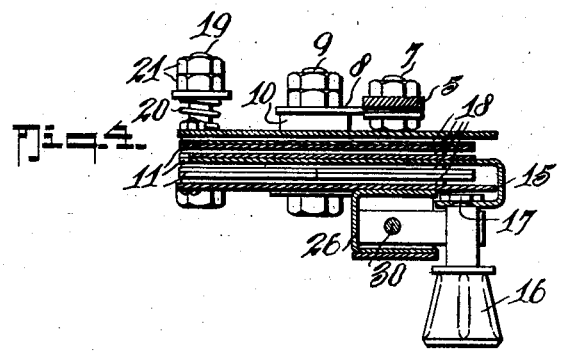
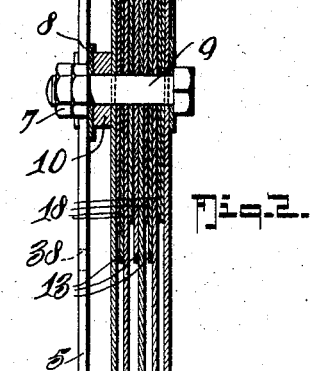
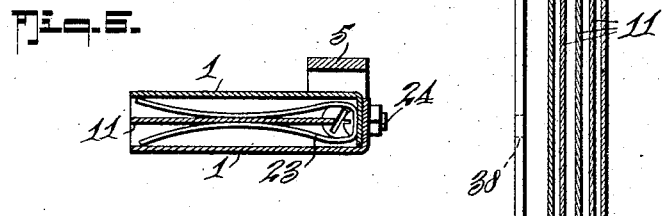
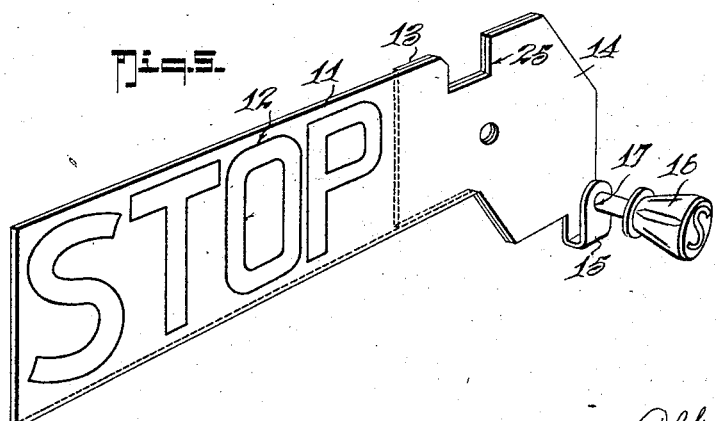
INVENTOR
J. Evich.
BY
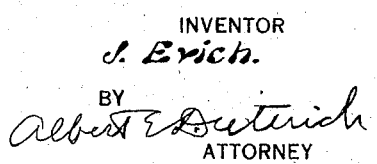
ATTORNEY Patented Nov. 3, 1925.

1,559,603

UNITED STATES PATENT OFFICE.

JERIE EVICH, OF SANTA BARBARA, CALIFORNIA.

DIRECTION INDICATOR.

Application filed June 17, 1924. Serial No. 720,705.

*To all whom it may concern:*

Be it known that I, JERIE EVICH, a citizen of the United States, residing at Santa Barbara, in the county of Santa Barbara and State of California, have invented a new and Improved Direction Indicator, of which the following is a specification.

The invention generally relates to direction indicators and more particularly to that class of such indicators as are adaptable for being mounted upon the body of a motor vehicle in position for being mechanically operated to indicate directions which the driver of the motor vehicle is about to take as, for example, a turn to the right or to the left or a stop.

In its more detailed nature, the invention seeks to provide a direction indicator of the class stated which is of a structure easily operable for the purpose for which it is designed, which is of a simple nature that may be economically manufactured and which embodies features of construction which facilitate perfect operation of the same under all conditions and in which the parts are so constructed and cooperatively arranged as not to be open to the objections of being unsightly and liable to cause annoyance by rattling.

With the above and other objects in view, the invention further resides in those novel details of construction, all of which will be first fully described in the following specifications, then be particularly pointed out in the appended claims, reference being had to the accompanying drawings, in which:

Figure 1 is a face view of the invention, one of the indicating arms being moved to the indicating position in full lines and shown in the progress of closing in dotted lines.

Figure 2 is a vertical cross section of the invention taken through the plane of the pivot bolt.

Figure 3 is a plan view of the invention.

Figure 4 is a horizontal section taken on the line 4—4 of Figure 1.

Figure 5 is a detail perspective view of one of the indicator arms.

Figure 6 is a horizontal section taken on the line 6—6 on Figure 1.

Figure 7 is a detail edge view illustrating the spring tension connection and the adjacent parts.

Figure 8 is a detail vertical cross section of the spring clip supporting housing.

In the drawings, in which like numerals of reference indicate like parts in all of the figures, 1 indicates the opposing side plates which are angled flange bent at their ends, as at 2, and at the lower half portion of their rear edges, as at 3, to provide a suitable housing for the indicating arms in the manner soon to be described. The housing thus formed is wholly open at its front edge (to the left of Figure 1) and having the upper half of its rear edge open likewise (upper right side of Figure 1). The flanges may be suitably rivet secured, as at 4, so as to effectively prevent rattling of the engaging parts.

A securing bar 5 is secured at its ends, as at 6, to the housing in a manner for being in spaced relation therewith to facilitate the mounting of the invention in suitable position upon a motor vehicle for being readily viewed by traffic. The securing bar 5 is also secured intermediately of its ends, as at 7, through the medium of the plate connection 8 secured to the pivot bolt 9 which passes through the housing plates 1 and through the heads of the indicating arms. By thus mounting the securing arm, it is effectively held against excessive flexure and vibration and also against rattling. A spacer 10 is mounted upon the pivot bolt 9 between the adjacent housing plate 1 and the plate connection 8 so as to suitably space the latter plate.

To provide for suitably indicating the direction or the contemplated action to be taken by the driver of the motor vehicle, I provide a plurality of indicating arms which are pivotally mounted upon the housing in a manner that the same will be completely hidden when in the closed position, but which may be individually moved to an extended position for bringing into view the indicating marking upon the said arms in the manner soon to be described. Each indicating arm includes the main body portion 11 upon both faces of which is marked the desired indicating lettering indicated at 12. In the drawings, three indicating arms are illustrated and it should be understood that in this embodiment of the invention the arms would be marked as follows on the reverse sides thereof: "Stop," "Right" and "Left."

The portions of the indicating arms which lie within the housing, that is, that part which does not project beyond the housing when the arms are in their extended position, is termed the head of the indicating arm and each such indicating arm head is reinforced and strengthened as at 13 and is thus indicated by the numeral 14. In this manner the head 14 of the indicating arm is greatly strengthened and is to some degree counterbalanced.

Each head 14 is provided with an extension which is bent at 15 to straddle the front plate 1 of the housing and for providing a suitable securing means for the respective operating knob 16 secured thereto as at 17, see Figures 4 and 5.

Between each of the indicating arm heads 14 and the adjacent housing plates 1 and upon the pivot bolt 9 are positioned suitable spacer washers 18 for facilitating the desired tight frictional movement of the indicating arms.

It should be understood that the arms 11 are to be frictionally held to either their closed or extended positions against rattling and also against such action one upon another as would tend to scratch the marking thereupon. To provide for the proper tensioning and frictional movement of the indicating arms I provide a tension bolt 19 which passes through the housing plates adjacent the front edge thereof and at a point for providing a suitable stop against movement of the indicating arms 11 after they have reached the extended horizontal position illustrated in Figure 1 of the drawings. Upon one end of the tension bolt 19 is mounted a suitable spring tension connection 20, and suitable spring tension adjusting and jam nuts 21 are provided for making the desired adjustment, that the arms may be held in the desired frictional engagement one with the other such as will ensure the most efficient cooperation thereof at all positions.

It will be observed from Figures 1 and 2 of the drawings that the central one of the indicating arms 11 is of slightly greater length than the arm at each side thereof to thus provide an extension 22 which will be effectively engaged by the spring clip 23 when the said arm is in its lowered position illustrated in Figure 2 of the drawings to thus hold the said arm against lateral swinging such as would cause a rattling and the probable chipping of indicating marking from the remaining arms. The spring clip 23 may be secured as at 24 to the rear flanges 4 of the housing.

It will be observed from Figures 1, 5 and 7 of the drawings, that each of the indicating arm heads 14 are suitably cut out, as at 25, to avoid the tensioning and stop bolt during their movement. A spring clip supporting housing 26 is secured upon one side of the housing, by the bolt 27 at its upper end, and by the pivot bolt 9, at its lower end, and the said housing includes partition members 28 which serve as a securing means for facilitating the mounting of the spring clips 29 secured thereto, as at 30, (see Figures 1, 2, 4 and 8 of the drawings). The spring clips 29 are adapted to engage the shanks of the knobs 16 to securely hold the same to the arm retracted or closed positions, see Figures 1 and 3 of the drawings.

A short socket member 31 is secured at the uppermost points of the front edge and the said socket provides suitable connecting means for the electric lamp 32, a housing 33 being provided to fit over the said lamp and be secured to the said socket and which is of such a shape that it will effectively protect the lamp against breakage and will direct the rays of light thereof directly upon the particular indicating arm 11 which happens to be extended, thus making it possible to use the invention as well in darkness as in daylight. The electric wiring 34, which connects the lamp 32 with a suitable source of energy (not shown) passes from the socket 31 through a portion of the housing and through suitable apertures 35 provided therefor in the top flanges 4 of the housing, (see Figures 1 and 3).

If desired, the housing itself may be marked with suitable indicating marking, such as is indicated by the numeral 26. This marking may be any that the owner of the device desires, and may either serve to indicate that the driver intends to continue straight ahead or may be in the nature of a monogram or other indicating marking, as desired.

When the operator of the motor vehicle desires to use the invention to indicate the direction of turn he is about to take or that he is about to stop, he will grasp the respective knob 16 and pull the same downwardly on the arc provided by reason of the pivotal connection 9. It will be observed that each of the knobs is suitably marked as at 37 to correspond with the indicating marking on the indicating arm body 11 of which the same form a part.

This will serve to extend the desired indicating arm in the manner illustrated in Figure 1 of the drawings. By reason of providing the tensioning connections, the arm will be effectively held at its extended position until the operator, by grasping the knob returns the said arm to its normal position in the manner indicated by the arrows on the said Figure 1. When all of the indicating arms are at their retracted or closed position they will be held to such position by reason of the spring tension devices and also by engagement of the shanks of the knobs 16 thereof with the spring holding clips 29.

By reason of providing the construction as shown in the drawings, a very compact and effectively operable device is provided such as will be readily operable for the purposes for which it is intended and which will be strong and durable and not subject to ready breakage, and which is of a compact nature such as will take up but very little space and which is conveniently and manually operable.

The securing bar 5 may be provided with suitable apertures 38 whereby connections may be readily made for mounting the same upon the side of a motor vehicle in suitable position.

From the foregoing description, taken in connection with the accompanying drawings, it is thought the novel details of construction, the manner of operation and advantages of my invention will be readily apparent to those skilled in the art to which the same relates.

What I claim is:

1. A device of the class described comprising, a housing, indicator arms pivoted in the housing and adapted to lie within the confines of the same when inactive and for being extended from the housing to an active position, and a stop and tension device for holding the arms in frictional engagement and for stopping the same at the proper extended position.

2. A device of the class described comprising, a housing, indicator arms carried by the housing to be hidden thereby when inactive and for being extended beyond the confines of the housing when active, one of the said arms having an end extension, and a spring clip holding device for engaging the end extension of the arm to hold the said arm against play.

3. A device of the class described comprising, a housing, three indicator arms pivoted in the housing in a manner for being hidden thereby when inactive and for being extended beyond the confines of the housing when active, the middle one of the said three arms having an end extension, and a spring clip holding device for engaging the end extension of the said middle arm to hold the same against play.

4. A device of the class described comprising, a housing, indicator arms suitably marked to indicate direction pivoted upon the housing and adapted to lie within the confines of the same when inactive and for being extended from the housing to an active position, and a stop and tension device for holding the arms in frictional engagement and for stopping the same at the proper extended position, and knobs marked to correspond with the arm markings and adapted to be hand engaged for moving the said arm.

5. A device of the class described comprising, a housing, indicator arms suitably marked to indicate direction pivoted upon the housing and adapted to lie within the confines of the same when inactive and for being extended from the housing to an active position, a stop and tension device for holding the arms in frictional engagement and for stopping the same at the proper extended position, knobs marked to correspond with the arm markings and adapted to be hand engaged for moving the said arms, and spring clip devices for holding the knobs to the arm in active position.

6. A device of the class described comprising, a housing, indicator arms suitably marked to indicate direction pivoted upon the housing and adapted to lie within the confines of the same when inactive and for being extended from the housing to an active position, a stop and tension device for holding the arms in frictional engagement and for stopping the same at the proper extended position, knobs marked to correspond with the arm markings and adapted to be hand engaged for moving the said arms, a lateral housing having partitions, and spring clip devices carried by the lateral housing and secured to the partitions and adapted to hold the knobs to the arm in active position.

7. A device of the class described comprising, a housing, indicator arms suitably marked to indicate direction pivoted upon the housing and adapted to lie within the confines of the same when inactive and for being extended from the housing to an active position, a stop and tension device for holding the arms in frictional engagement and for stopping the same at the proper extended position, knobs marked to correspond with the arm markings and adapted to be hand engaged for moving the said arms, extensions on said arms bent to straddle a portion of the housing, and knobs secured to the extensions and which are marked to correspond with the arm markings and adapted to be hand engaged for moving said arms.

8. A device of the class described comprising, a housing, indicator arms suitably marked to indicate direction pivoted upon the housing and adapted to lie within the confines of the same when inactive and for being extended from the housing to an active position, the said arms each having a reinforced head, washers positioned between the heads and the housing sides, a pivot bolt passing through the housing, washers and heads to provide a pivot for the arms, a stop and tension device for holding the arms in frictional engagement and for stopping the same at the proper extended position, and knobs marked to correspond with the arm markings and adapted to be hand engaged for moving said arms.

9. A device of the class described comprising, a housing, indicator arms suitably marked to indicate direction pivoted upon the housing and adapted to lie within the confines of the same when inactive and for being extended from the housing to an active position, the said arms each having a reinforced head, washers positioned between the heads and the housing sides, a pivot bolt passing through the housing, washers and heads to provide a pivot for the arms, an adjustable stop and tension device for holding the arms in frictional engagement and for stopping the same at the proper extended position, knobs marked to correspond with the arm markings and adapted to be hand engaged for moving said arms, and spring clip devices for holding the knobs to the arm in active position.

10. A device of the class described comprising, a housing comprising opposing side plates angle flange connected at top and bottom and at a part of the rear edges thereof, indicator arms suitably marked to indicate direction pivoted upon the housing and adapted to lie within the confines of the same when inactive and for being extended from the housing to an active position, a stop and tension device for holding the arms in frictional engagement and for stopping the same at the proper extended position, knobs marked to correspond with the arm markings and adapted to be hand engaged for moving the said arms, and spring clip devices for holding the knobs to the arm in active position.

11. A device of the class described comprising, a housing, indicator arms suitably marked to indicate direction pivoted upon the housing and adapted to lie within the confines of the same when inactive and for being extended from the housing to an active position, the said arms each having a reinforced head, washers positioned between the heads and the housing sides, a pivot bolt passing through the housing, washers and heads to provide a pivot for the arms, an adjustable stop and tension device for holding the arms in frictional engagement and for stopping the same at the proper extended position, knobs marked to correspond wtih the markings and adapted to be hand engaged for moving said arms, extensions on said arms bent to straddle a portion of the housing, and knobs secured to the extension and which are marked to correspond with the arm markings and adapted to be hand engaged for moving said arms.

JERIE EVICH.